E. PLANCHE.
GEAR SHIFTING MECHANISM.
APPLICATION FILED JULY 23, 1914.
1,209,754.
Patented Dec. 26, 1916.
4 SHEETS—SHEET 1.
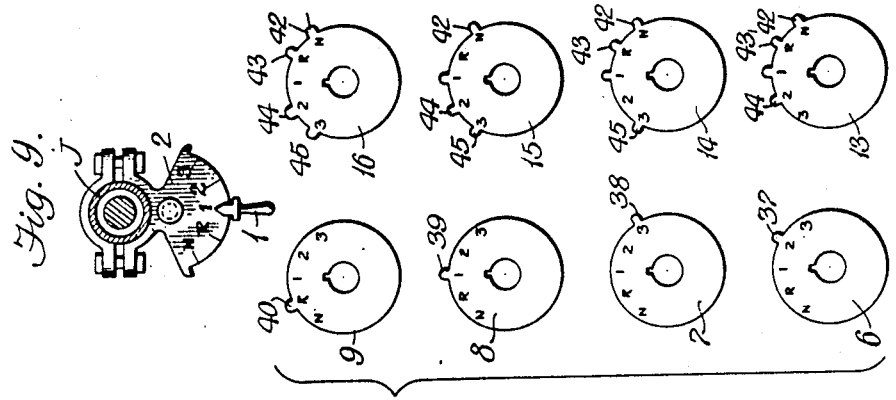
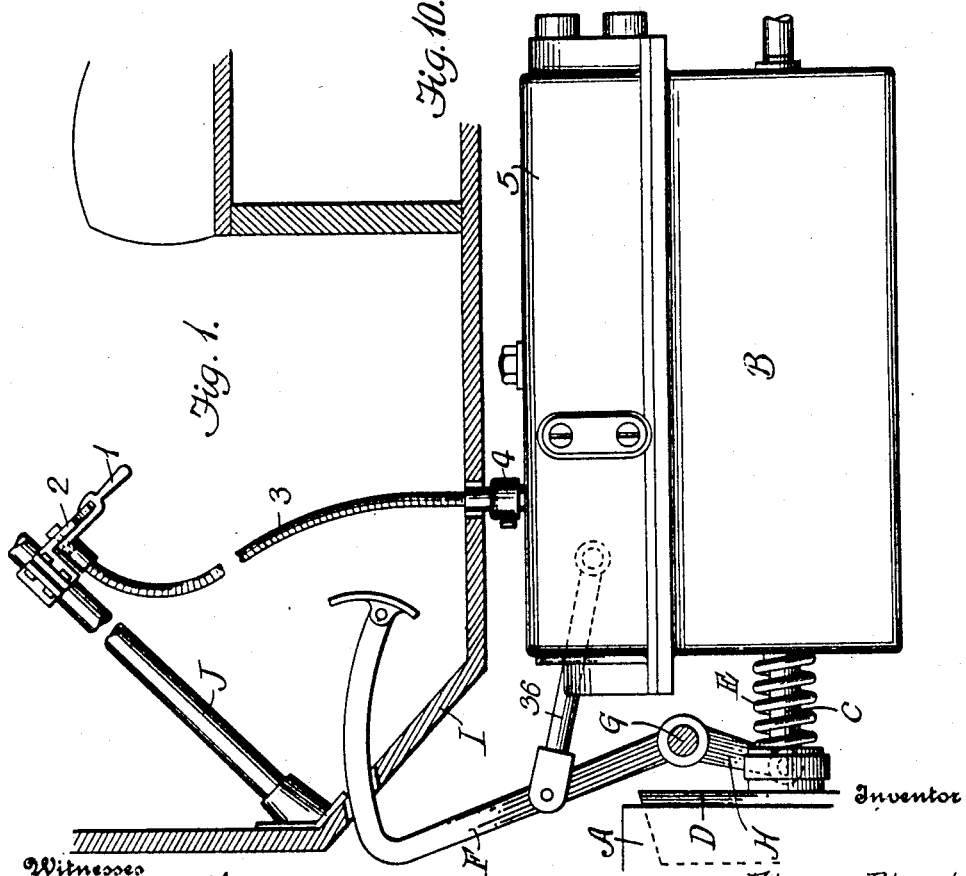
Witnesses
Chas W. Stauffiger
Arthur F. Draper
Inventor
Etienne Planche,
By
Attorney

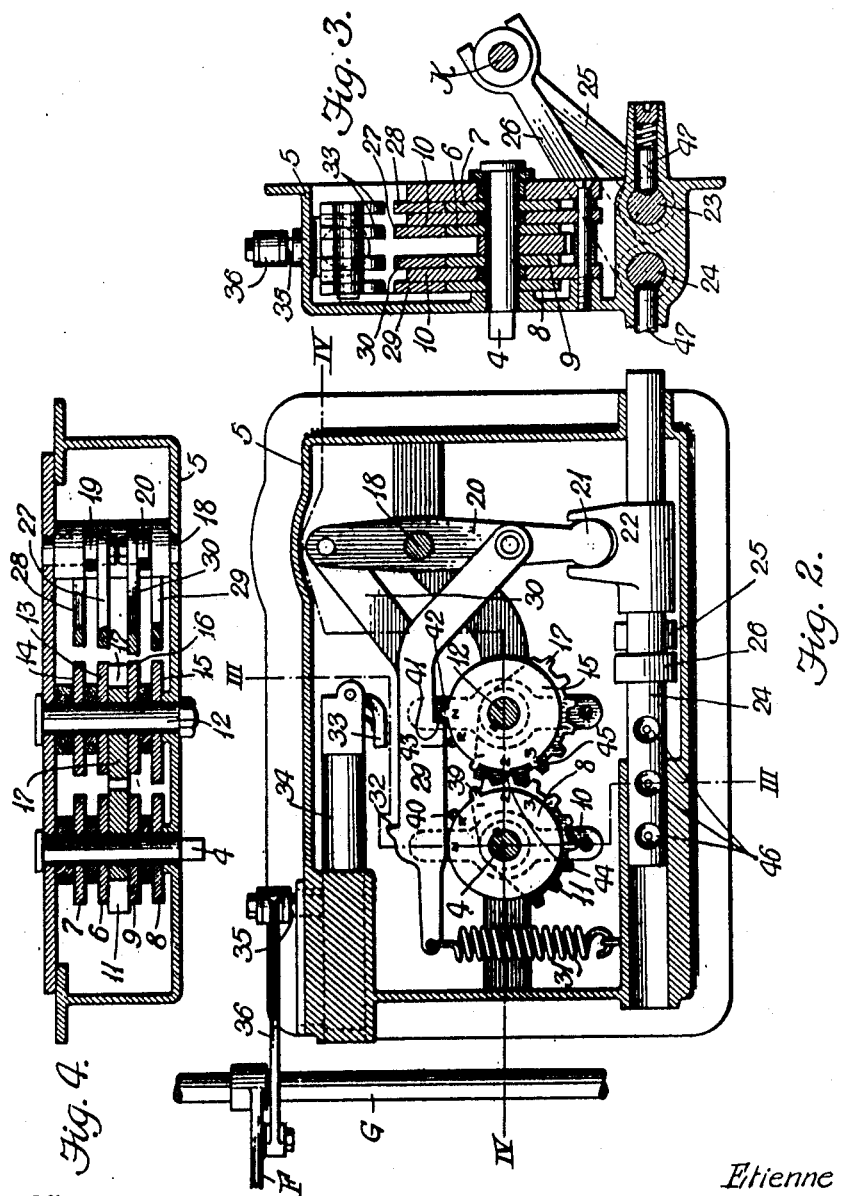

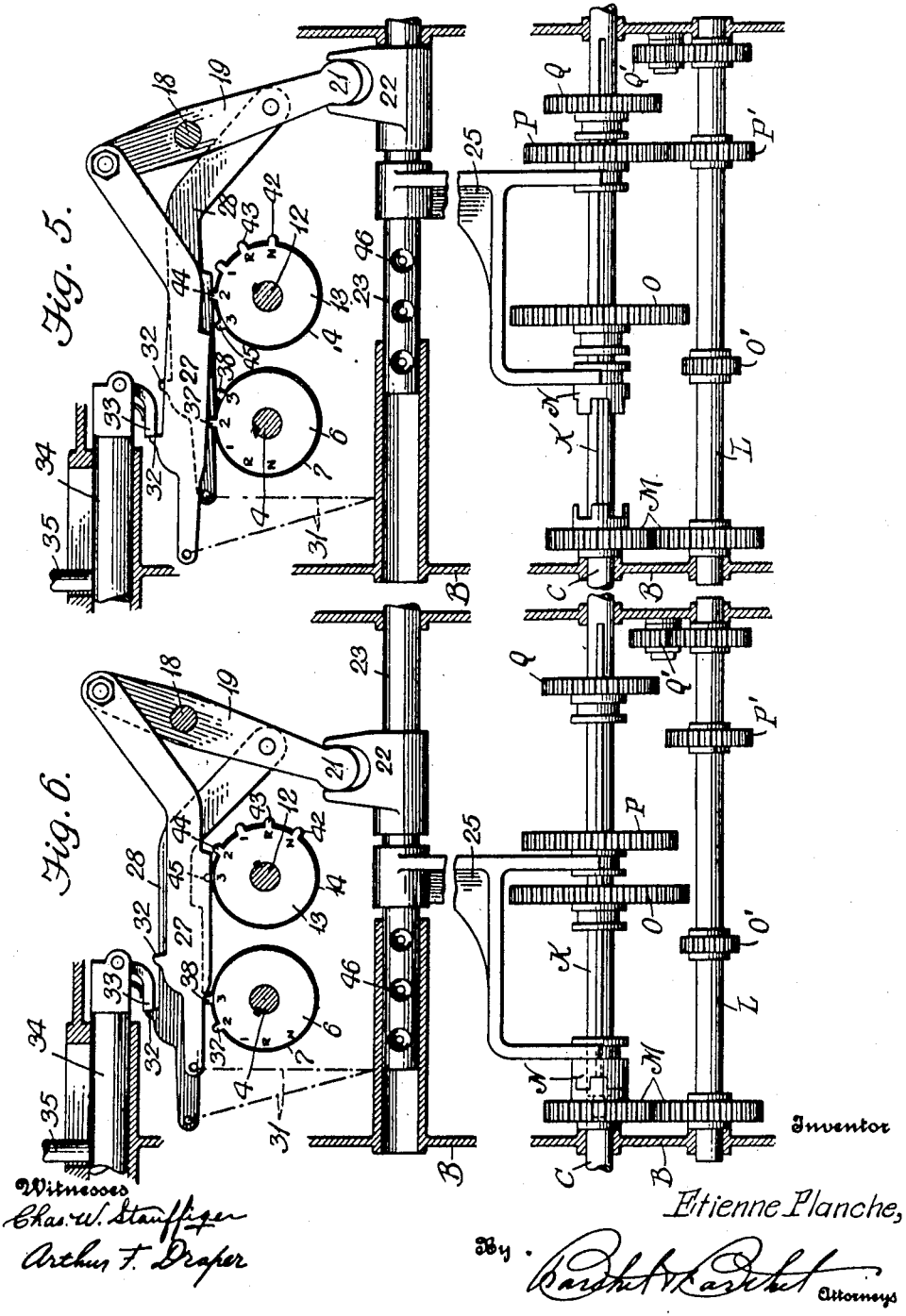

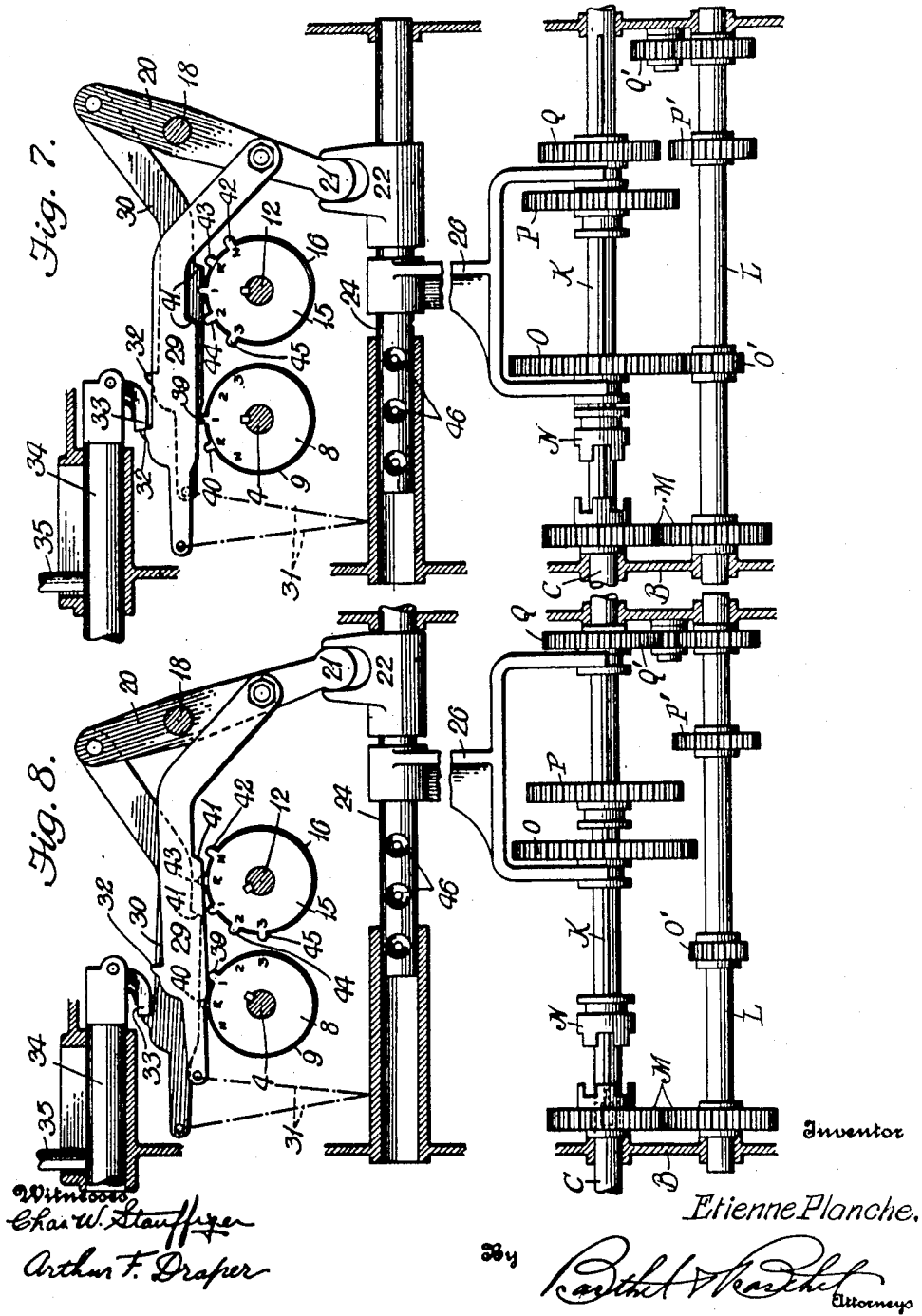

UNITED STATES PATENT OFFICE.

ETIENNE PLANCHE, OF FLINT, MICHIGAN.

GEAR-SHIFTING MECHANISM.

1,209,754.  Specification of Letters Patent.  Patented Dec. 26, 1916.

Application filed July 23, 1914. Serial No. 852,562.

*To all whom it may concern:*

Be it known that I, ETIENNE PLANCHE, a citizen of the Republic of France, residing at Flint, in the county of Genesee and State of Michigan, have invented certain new and useful Improvements in Gear-Shifting Mechanisms, of which the following is a specification, reference being had therein to the accompanying drawings.

This invention relates to means for shifting the gears of a change speed power transmitting mechanism and more particularly to selective mechanism whereby any desired gear change is effected by the operation of a lever for actuating the clutch connecting the motor and said change speed mechanism of a motor vehicle power plant.

An object of the invention is to provide a construction whereby when the gears are in position to transmit a certain speed, they may be shifted to give any desired speed, and in making the change all of the gears will be moved to neutral or inoperative position before assuming their new relation.

A further object is to provide simple and efficient selective mechanism adapted to be operated or set by means which may be placed in any convenient position, and to provide a compact and convenient arrangement whereby the same is adapted to be secured to the usual form of transmission casing.

It is also an object of the invention to provide certain other new and useful features in the construction and arrangement of parts, all as hereinafter more fully described and pointed out in the appended claims, reference being had to the accompanying drawings in which—

Figure 1 is a side elevation of mechanism embodying the invention, showing the same in operative position relative to the several adjacent parts of a motor vehicle; Fig. 2 is a plan view of selective mechanism embodying the invention and showing the casing thereof in section; Fig. 3 is a transverse section of the same upon the line III—III of Fig. 2; Fig. 4 is a transverse section of the same substantially upon the line IV—IV of Fig. 2; Fig. 5 is a sectional detail showing second and third speed tumblers and their cam disks in side elevation and illustrating diagrammatically the change speed gearing in second speed position; Fig. 6 is a similar detail showing the parts shifted to third speed position; Fig. 7 is a similar detail showing the first speed and reverse tumblers and their cam disks in elevation and the change speed gearing in first speed position; Fig. 8 is a like detail illustrating the parts shifted to "reverse" position; Fig. 9 is a detail of a selective lever showing the same attached to a steering column; and Fig. 10 is a diagrammatic illustration of the several cam disks showing the relative positions of their cam projections.

As shown in Fig. 1, A indicates the fly wheel of a motor and B the casing of a change speed power transmitting mechanism arranged in the usual manner directly to the rear of the fly wheel and receiving motion from the engine and fly wheel through the power shaft C and clutch D arranged to engage the fly wheel and connect or disconnect the motor and transmission mechanism. The clutch D is moved out of frictional contact with the fly wheel against the action of a spring E sleeved upon the shaft C, by means of a foot lever F pivotally supported on a transverse shaft G which has an operating arm H to shift the clutch in the usual manner.

I indicates the floor board of the vehicle body which forms a support for a steering column J and clamped or otherwise secured to this steering column in a position to be readily operated by the driver, is a control lever 1 pivotally attached to swing over a sector 2 having markings thereon to indicate the several speed changes of the change speed gearing. Connected to the operating lever 1 is a flexible shaft 3 extending downward through the floor board and detachably secured to the outer end of a shaft 4 mounted in suitable bearings in a cap 5 which forms a cover for the transmission casing B.

Secured upon the shaft 4 within the cover or casing 5 is a series of four cam disks 6, 7, 8 and 9 hereinafter designated as selectors, arranged in pairs, the disks of each pair being separated by suitable spacers 10 and the pairs of disks being arranged at opposite sides of a suitable segmental gear 11 which is also secured upon the shaft to turn therewith. Extending parallel with the shaft 4 is a like shaft 12 having mounted thereon and secured thereto to turn therewith a like number of corresponding cam disks 13, 14, 15 and 16 hereinafter called neutralizers, similarly arranged with an interposed gear segment 17 in mesh with the segment 11 so that when the shaft 4 is turned by means of the control lever 1, the shaft 12 will be turned a like distance in an opposite direction.

In the rear part of the casing is mounted a shaft 18 and on this shaft are two rocker arms 19 and 20 pivotally supported by the shaft intermediate their ends and each having a head 21 on its extended end to engage yokes 22 fixed upon longitudinally movable shafts 23 and 24 extending longitudinally of the casing and arranged in parallelism. These shafts 23 and 24 carry arms 25 and 26 each having two forked ends for engaging the grooved hubs of the several sliding gears of the change speed mechanism, to shift said gears in the usual manner in changing their relation to change the speed.

As illustrated diagrammatically in Figs. 5 to 8 inclusive, a driven shaft K is arranged in the casing B in longitudinal alinement with the power shaft C and a counter shaft L is supported in the casing parallel to the shaft K. Motion is transmitted from the shaft C to the counter shaft L by means of gears M and a clutch member N slidable on the shaft K is adapted to engage the hub of the gear M and lock the shaft C to the shaft K so that motion will be transmitted to said driven shaft at third or high speed direct from the power shaft. A gear O on the shaft K is adapted to engage a pinion O' on the counter shaft and thus transmit motion to the driven shaft at first or low speed. A gear P slidable upon the shaft K is adapted to engage a pinion P' on the counter shaft to give intermediate or second speed, the gear P and clutch member N being both shifted by means of the arm 25 which has two forked ends to engage said gear and clutch member. A gear Q on the shaft K is adapted to be moved into engagement with an intermediate gear Q' and thus give reversal of motion. The gear Q and the gear O are engaged by the forked ends of the arm 26 to be simultaneously shifted when the shaft 24 is moved.

Pivotally attached to each of the rocker bars 19 and 20 are two tumbler bars corresponding to the pairs of cam disks on the shaft 4, a tumbler bar 27 engaging at one edge the edge of the disk 6 and like tumbler bars 28, 29 and 30 engaging the edges of the disks 7, 8 and 9 respectively. The rear end of the tumbler bar 27 is bent upwardly and pivotally connected to the upper end of the rocker bar 19 and the rear end of the bar 28 is bent downwardly and pivotally connected to the bar 19 at an equal distance below the pivot of said bar. In a like manner the tumbler bar 30 is pivotally connected to the upper end of the arm 20 and the bar 29 is pivotally connected to said bar at a like distance from its pivot at the other side thereof. All of these bars are yieldingly held in contact with the edges of the cam disks by means of springs 31 attached to their forward ends and each of said tumbler bars is formed with a shoulder 32 on its edge opposite that engaged with the cam disks, to be engaged by spring dogs 33 pivotally attached to the inner end of a longitudinally movable shifter 34 which is mounted in a suitable guide bearing in one side of the casing and has a pin 35 extending laterally therefrom through a slot in the casing, said pin being connected by a link 36 with the clutch pedal F so that when said pedal is actuated the shifter 34 will be moved in the casing.

The selector disks 6, 7, 8 and 9 are provided with cam projections 37, 38, 39, 40, respectively (see Fig. 10) and these cam projections on the several disks are so arranged, relatively, that only one of them will engage one of the tumbler bars at a time. The function of these cam projections is to move the tumbler bars against the action of the springs 31, into the path of the dogs 33. The neutralizer disks 13, 14, 15 and 16 on the shaft 12 are also each provided with a plurality of cam projections having a certain arrangement relative to the cam projection on its corresponding selector disk and said projections are adapted to engage and lift the particular tumbler bar which happens to be at the rear end of its stroke when said neutralizers are turned by a re-setting of the selectors, said tumblers being each provided with a projecting edge portion 41 to be engaged by said cam projections. For convenience of illustration, in Fig. 10 the several speed positions indicated upon the segment 2 for the lever 1, are indicated in a like manner upon the several disks, the selector disks 6, 7, 8 and 9 being provided with cam projections in "2" speed, "3" speed "1" and "R" speed positions respectively. Each of the neutralizer disks is provided with a cam projection 42 in "N" or "neutral" position and disks 13, 14 and 16 with a projection 43 in "R" or reverse position. Disks 13, 15 and 16 each have a projection 44 in "2" or second speed position and disks 14, 15 and 16 with a projection 45 in "3" or third speed position.

To yieldingly hold the shifting rods 23 and 24 in the several positions to which they are adapted to be shifted to give the desired speed change, each rod is formed with concavities 46 adapted to be engaged by spring actuated stop pins 47.

In operation, the driver first turns the control lever to the position on the sector 2 indicating the speed desired. The turning of this lever rotates the shaft 4 through the medium of the flexible shaft 3 and sets the selectors so that the disk having the cam projection which is positioned as indicated in Fig. 10 to correspond with the position in which the lever is set, is brought into contact with the opposed tumbler bar and raises the same against the action of its spring into the path of one of the dogs carried by the actuating rod 34. The clutch D being in engagement, the foot pedal will have been thrown upwardly, as shown in Fig. 1 and the actuating rod will be at the inmost end of its stroke. The operator by then depressing the pedal F first throws out the clutch and a further movement of the pedal brings the dog 33 into engagement with the tumbler bar which has been moved by the selector. Continued movement of the pedal carries the tumber bar forward, the same riding upon the cam projection of the selector disk and this forward movement of the tumbler bar turns the rock arm to which it is attached and actuates one of the shifting rods carrying the forked arm which is in engagement with the particular change speed gear which it is desired to move. When the lever 1 has been thus set and the parts actuated as shown in Figs. 7, 9 and 10, the gears will have been shifted to first speed position. Upon the described forward movement of the tumbler bar 29, the tumbler 30 will be moved simultaneously to the rear or inward end of its stroke by reason of its pivotal connection with the upper end of the rocker bar 20 with the parts in position shown in Fig. 7. Should the operator desire to shift the gears into any one of their other positions, it will be necessary for him to set his selector so that the particular tumbler bar corresponding to the speed which he desires, will be moved into the path of one of the dogs on the actuating rod. A throwing in of the clutch will then move the actuating rod inward, the dog sliding over the shoulder of the bar which has been moved into its path, and then the first movement of the foot pedal in disengaging the clutch will bring the dog into engagement with the moved tumbler bar and said bar will be carried forward as before. It is necessary however, when the gears are in any particular speed position, as for instance in first speed, as indicated in Fig. 7, that these gears be moved to neutral position before any gears giving another change of speed are brought into mesh. To effect this shifting to neutral position automatically, a series of neutral disks are secured upon the shaft 12 there being one of these disks opposite each one of the selector disks. As shown in Figs. 7 and 10, there is a neutralizing disk 16 opposite the edge of the tumbler bar 30 which was moved rearwardly when the first speed tumbler bar 29 was carried forward to effect the first speed shift. This neutralizing disk 16 is provided with cam projections 42, 43, 44 and 45 in the several positions to which the corresponding selector disk may be turned to set these disks for giving any one of the other speed changes. The shafts 4 and 12 being connected by the gear segments to turn in opposite directions, when the shaft 4 is turned from the position in which it is shown in Fig. 7 to re-set the selectors for the change of speed desired, the neutralizing disks will be simultaneously turned and one of the four cam projections upon the disk 16 will be brought into contact with the edge of the tumbler 30. This will move this tumbler into the path of the actuating dog and the re-setting of the selectors will simultaneously move the cam projections 39 on the selector disk 8 from engagement with the tumbler 29, permitting its spring to move said tumbler out of the path of the actuating dog. The tumblers are now reset so that the throwing out and in of the clutch by means of the foot pedal will give the desired speed change, and simultaneously move the first speed and reverse gears controlled by the tumblers 29 and 30 into neutral position. This neutral shift is accomplished by the shifting dog coming into engagement with the bar 30 which as described has been moved into its path by means of a cam projection on the disk 16. The tumbler 30 will thus be carried forward by the forward movement of the actuating dog until the projecting edge portion 41 of said bar drops off from the cam projection on the disk 16. This edge portion of the bar is of such a length that when it drops off from the cam projection, the rocker 20 will be in mid position and the gears shifted thereby will be out of mesh or in neutral position. The dropping of the tumbler 30 off from the cam projection disengages the tumbler from the actuating dog and thus the gears are left in their neutral position. The continued forward movement of the actuating rod 34 brings one of its dogs into engagement with the particular tumbler which was moved into its path when the selectors were reset.

It will be noted that the selector disks are not provided with cam projections in their "neutral" position, but all of the neutral disks are provided with cam projections at their "neutral" points; therefore when the selectors are set to "neutral", the neutralizers are each turned to bring their cam projections 42 into operative position and any tumbler which is at the rear end of its stroke will be moved into the path of its actuating dog. The actuation of the foot pedal thereafter will thus shift gears controlled by this tumbler into neutral position as previously described, and as none of the tumblers were moved into the path of the actuating dogs by the turning of the selectors to neutral position, all of the gears will be left in "neutral." It will thus be seen that the gears may be shifted from any one of their positions into any other position at the will of the operator and the gears which were in mesh will automatically be moved into neutral in making the shift. Reliability in the operation is therefore assured and the construction is such as to make the operation positive and accurate, and simplicity is secured making the device cheap to manufacture and obviating the liability of its getting out of order.

Obviously other forms of change speed mechanism may be used and numerous changes in the construction and arrangement of the mechanism may be made within the scope of the appended claims without departing from the spirit of the invention. I therefore do not limit myself to the particular form or arrangement shown.

Having thus fully described my invention what I claim is:—

1. The combination with power transmitting mechanism including a plurality of speed changing elements, of an actuating member, a series of members each operatively connected to one of said elements, a series of selector members, and means for simultaneously actuating said selector members to bring one of the series in operative position relative to one of said members and effect an operative connection between said member and said actuating member.

2. The combination with power transmitting mechanism including a plurality of shiftable speed changing elements, of a plurality of members corresponding in number to the number of said elements and operatively connected thereto to shift the same, means connecting said members to cause adjacent members to move in opposite directions, an operating member, and means for mechanically operating said members to operatively connect said members and said actuating member.

3. The combination with power transmitting mechanism including speed changing elements shiftable into operative position in opposite directions, of shifting members for shifting each of said elements, which members are simultaneously movable in opposite directions, an actuating member, selective means for moving said shifting members to effect an operative connection between the same and said actuating member, and means actuated simultaneously with the actuation of the selective means for moving certain of said shifting members.

4. The combination with power transmitting mechanism including a plurality of shiftable change speed elements, a shifter, means for actuating the shifter, a tumbler operatively connected to each of the change speed elements to shift the same, selector members for moving the tumblers into operative position to be actuated by the shifter, and means for actuating the selector members.

5. The combination with power transmitting mechanism including a plurality of shiftable change speed gears, of a shifting member, a plurality of tumblers operatively connected with the gears to shift the same, means on the shifter for engaging the tumblers, and means for selectively moving the tumblers into the path of the means on the shifter to cause the tumblers to be moved by a movement of the shifter.

6. The combination with power transmitting mechanism including a plurality of shiftable change speed gears, of a shifter, a plurality of tumblers adapted to be engaged and moved by the shifter, a series of selector members for engaging the tumblers and moving the same into the path of the shifter, and a series of members actuated simultaneously with the actuation of the selectors for moving certain of the tumblers into the path of the shifter.

7. The combination with power transmitting mechanism including a plurality of shiftable change speed gears adapted to be shifted into operative position in opposite directions, a tumbler for each of said gears operatively connected thereto to shift the same, means connecting said tumblers to simultaneously move the same in opposite directions, a shifter, a selector for moving the tumblers into the path of the shifter to effect the change of speed, and a neutralizing member operated simultaneously with the operation of the selector to move certain of the tumblers into the path of the shifter to be engaged thereby when the shifter is actuated to engage the other tumblers and effect the change of speed.

8. The combination with power transmitting mechanism including a plurality of shiftable change speed gears, of a series of longitudinally movable members arranged in pairs, rocker members connecting the members of each pair to cause the same to move simultaneously in opposite directions, said rocker members being operatively connected to said gears to shift the same, a shifter for moving the longitudinally movable members, selective means for moving the longitudinally movable members into the path of the shifter, and separate means for moving the members which have been moved longitudinally to effect an operative connection between them and the shifter and cause the gears to be moved into inoperative position.

9. The combination with power transmitting mechanism including shiftable change speed gears, members for shifting said gears, tumblers operatively connected to said members to actuate the same and shift the gears, a rotatable selector for each tumbler, said selectors being connected to turn together and relatively set to engage their tumblers at different times, means rotatable simultaneously with the selectors and having projections to engage the tumblers and move the same, and means for turning the selectors.

10. The combination with change speed power transmitting mechanism including shiftable gears, a series of tumblers corresponding in number to the number of said gears, a shifter, means for actuating the shifter, dogs carried by the shifter to engage and actuate the tumblers, a selector member for each tumbler to move the tumblers into the path of the dogs, said tumblers being adapted to move out of the path of the dogs when the selectors are reset, and separate means for moving the tumblers into the path of the dogs to cause the gears to be shifted into inoperative position when the shifter is again moved.

11. The combination with power transmitting mechanism including a plurality of speed changing elements, of a shifting member for each of said elements, an operating member, selective means for effecting an operative connection between any one of said shifting members and said operating member to move a speed changing element to operative position, and means operated simultaneously with said selective means for effecting an operative connection between another of said shifting members and said operating member to shift another of said speed changing elements to inoperative position.

12. The combination with power transmitting mechanism including a plurality of speed changing elements, of an actuating member for each of said elements, selective means for effecting an operative connection between any one of said speed changing elements and its actuating member to give a change of speed, and means actuated relatively to and simultaneously with said selective means for effecting an operative connection between another of said speed changing elements and its actuating members to move said other speed changing element to inoperative position.

13. The combination with change speed power transmitting mechanism including a plurality of speed changing elements, of a shifter, a plurality of operating members operatively connected to said speed changing elements to operate the same to change the speed, a selector member for each of said operating members adapted to move the same into the path of the shifter to be actuated thereby, said selector members being connected to move together and relatively positioned to operate said members at different times, means for moving each operating member out of the path of the shifter independently of the other operator members, and a rotatable member for each operating member having a plurality of projections to engage and move said operating members into the path of the shifter.

14. The combination with power transmitting mechanism including a plurality of shiftable gears, of members for shifting the gears, a shifter, tumblers operatively connected to said members, a pair of rotatable members having projecting portions to engage and move each tumbler into the path of said shifter, means for turning the members of each pair simultaneously in opposite directions, and means for yieldingly holding said tumblers in position to be engaged by said rotatable members.

15. The combination with power transmitting mechanism including a plurality of shiftable gears, of a longitudinally movable shifter, a plurality of longitudinally movable tumblers adapted to be moved laterally into the path of said shifter to be actuated thereby, said tumblers being operatively connected with said gears to shift the same, parallel shafts, a series of members secured to each shaft to turn therewith, each member being formed with a projection to engage the tumbler adjacent thereto and said tumblers being formed to permit the same to move toward the series of said members out of the path of said shifter, means for causing the shafts to turn together, and manually operable means for turning one of the shafts.

16. The combination with power transmitting mechanism including shiftable gears, of a gear shifting member movable longitudinally, a rocker bar for moving said member, tumblers pivotally attached at one end to said rocker, a shifter, a series of disks engaged by said tumblers and having projections relatively positioned to engage and move the tumblers into the path of the shifter at different times, means for yieldingly holding the tumblers in engagement with the disks, and means for turning the disks.

17. In a gear shifter, the combination of longitudinally movable members adapted to shift gears, a shifter, a series of tumblers corresponding in number to the number of speed changes to be effected, a series of selector members corresponding in number to the number of tumblers and each having a projection adapted to engage the opposed tumbler and move the same into the path of the shifter, said selectors being secured together with the projections relatively positioned to engage the tumblers successively, means for turning the selectors, means for yieldingly holding the tumblers out of the path of the shifter, and means connecting the tumblers and the longitudinally movable members for shifting the gears.

18. In a gear shifter, the combination of a casing, members projecting from the casing to engage and shift gears, rocker bars in the casing to actuate said members and shift the gears, tumblers connected to the rocker bars, a shifter longitudinally movable in the casing, a series of selectors to engage said tumblers and having projections relatively positioned, a series of neutralizers to engage the tumblers each having a plurality of projections, means for causing said selectors and neutralizers to turn simultaneously, and manually operable means for actuating one series.

19. In a gear shifter, the combination of a casing, a pair of shafts mounted in said casing, a series of disks on each shaft having projections, segments on the shafts to cause said shafts and disks to turn simultaneously in opposite directions, said disks being arranged in pairs upon each shaft, a pair of tumblers in engagement with each pair of disks, a rocker bar for each pair of tumblers to which said tumblers are pivotally attached at one end, a shifter adjacent to the tumblers at the side thereof opposite that engaged by the disks, and longitudinally movable members in the casing engaged and actuated by said rocker bars.

20. The combination with power transmitting mechanism including gears shiftable longitudinally in opposite directions to change the speed, of a pair of fork members for shifting said gears, a pair of rocker bars for actuating said fork members pivoted intermediate their ends, a pair of longitudinally movable tumbler bars pivotally attached at one end to each rocker, one tumbler of each pair being attached to its rocker at one side of the pivot of the rocker and the other tumbler of the pair being attached to the tumbler at the opposite side of said pivot to cause said tumblers to move in opposite directions when the rocker is rocked, a shifter movable longitudinally of said tumblers, dogs carried by said shifter to engage the tumblers, a series of selectors to engage the opposite side of the tumblers and move the same into the path of the dogs, springs for normally holding the tumblers out of the path of the dogs, and means for manually actuating the selectors.

21. The combination with power transmitting mechanism including a casing and shiftable speed changing elements in said casing, of a cover-casing, rods slidable in said cover-casing and provided with arms to engage and shift the speed changing elements, rocker bars pivoted intermediate their ends in the cover casing and adapted to move the slidable rods, tumbler bars arranged in pairs with one end of the bars of each pair pivotally connected to one of the rocker bars, one of said tumblers, of each pair being connected to its rocker at one side of the rocker pivot and the other tumbler at the other side of said pivot to move in opposite directions upon movement of the rocker bar, a shifter at one side of said tumblers movable longitudinally thereof, dogs on said shifter to engage the tumblers, a series of selector disks having projections to engage the tumblers at the opposite side, a series of neutralizing disks arranged in the plane of the other disks and provided with projections to engage the tumblers, shafts to which the series of disks are secured to turn therewith, gears on said shafts in mesh to cause the shafts to turn simultaneously in opposite directions, springs engaging the tumblers to yieldingly hold the same in contact with the disks, and means for turning one of the shafts to set the disks.

In testimony whereof I affix my signature in presence of two witnesses.

ETIENNE PLANCHE.

Witnesses:
 KARL H. BUTLER,
 G. E. McGRANN.

Copies of this patent may be obtained for five cents each, by addressing the "Commissioner of Patents. Washington, D C."